(12) United States Patent
Gailloux et al.

(10) Patent No.: US 9,672,512 B1
(45) Date of Patent: Jun. 6, 2017

(54) PROCESSOR ROUTING NUMBER FOR MOBILE COMMUNICATION SERVICE PROVIDER BILLING

(71) Applicant: Sprint Communications Company L.P., Overland Park, KS (US)

(72) Inventors: Michael A. Gailloux, Overland Park, KS (US); Brian T. Smith, Leavenworth, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 96 days.

(21) Appl. No.: 14/146,489

(22) Filed: Jan. 2, 2014

(51) Int. Cl.
*G06Q 20/32* (2012.01)
*H04L 29/06* (2006.01)

(52) U.S. Cl.
CPC .............................. *G06Q 20/3278* (2013.01)

(58) Field of Classification Search
CPC ......... G06Q 20/30; G06Q 20/18; G06Q 20/32
See application file for complete search history.

(56) References Cited

U.S. PATENT DOCUMENTS

| | | | | |
|---|---|---|---|---|
| 7,571,139 B1* | 8/2009 | Giordano | ............... | G06Q 20/04 705/37 |
| 7,742,967 B1* | 6/2010 | Keresman, III | ....... | G06Q 20/04 705/37 |
| 7,774,271 B1* | 8/2010 | Edwards | ................ | G06Q 20/10 705/38 |
| 8,073,759 B1* | 12/2011 | Del Favero | ........ | G06Q 10/0631 235/375 |
| 8,160,941 B1* | 4/2012 | Field | ...................... | G06Q 10/10 705/30 |
| 8,321,310 B1* | 11/2012 | Keld | ...................... | G06Q 10/10 705/30 |
| 8,606,640 B2* | 12/2013 | Brody | ................ | G06Q 20/0655 705/26.1 |
| 8,682,792 B2* | 3/2014 | Rammal | ................ | G06Q 20/12 705/39 |
| 8,856,539 B2* | 10/2014 | Weiss | ................... | G06F 21/6245 707/999.001 |
| 2006/0196930 A1* | 9/2006 | Hart | ...................... | G06Q 20/105 235/380 |

(Continued)

*Primary Examiner* — Talia Crawley

(57) ABSTRACT

A method of billing a payment transaction to a mobile communication service account. The method comprises receiving a request for mobile communication service provider billing approval from a payment processor, wherein the request comprises one of a phone number associated with a mobile communication service account or an equipment identification of a mobile communication device associated with the mobile communication service account, wherein the request comprises a processor routing number, wherein the processor routing number is consistent in format with one of a block of credit card numbers maintained by a mobile communication service provider, and wherein the processor routing number is used by different mobile communication devices associated with different mobile communication service accounts to complete payments. The method further comprises identifying the service account based on one of the phone number or the equipment identification of the mobile communication device, and charging to the mobile communication service account.

20 Claims, 7 Drawing Sheets

(56) References Cited

U.S. PATENT DOCUMENTS

| | | | |
|---|---|---|---|
| 2008/0082601 A1* | 4/2008 | Meijer | G06F 17/30569 709/203 |
| 2009/0037461 A1* | 2/2009 | Rukonic | G06Q 40/02 |
| 2009/0150265 A1* | 6/2009 | Keld | G06Q 10/10 705/30 |
| 2009/0222365 A1* | 9/2009 | McGlynn | G06Q 30/02 705/30 |
| 2010/0241570 A1* | 9/2010 | Keresman, III | G06Q 20/04 705/67 |
| 2011/0047045 A1* | 2/2011 | Brody | G06Q 20/0655 705/26.41 |
| 2011/0295750 A1* | 12/2011 | Rammal | G06Q 20/12 705/44 |
| 2012/0005342 A1* | 1/2012 | Deng | G06F 9/5044 709/225 |
| 2013/0166448 A1* | 6/2013 | Narayanan | H04W 12/04 705/44 |
| 2014/0101034 A1* | 4/2014 | Tanner | G06Q 20/10 705/39 |
| 2014/0137215 A1* | 5/2014 | Hummel | G06F 13/4022 726/5 |
| 2014/0172710 A1* | 6/2014 | Brody | G06Q 20/0655 705/44 |
| 2014/0172711 A1* | 6/2014 | Brody | G06Q 20/0655 705/44 |

* cited by examiner

PROCESSOR ROUTING NUMBER FOR MOBILE COMMUNICATION SERVICE PROVIDER BILLING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be used to complete payment transactions. For example, a near field communication (NFC) transceiver of the mobile communication device may engage in a payment transaction with a point-of-sale (POS) terminal to pay for goods and services. Such a payment transaction may be completed based on a secure element (SE) of the mobile communication device coupled to the near field communication transceiver, where the secure element stores electronic funds that may be reduced by payment transactions and incremented by deposit or "top up" transactions.

Alternatively, a payment transaction may be completed based on a credit card number stored in a memory of the mobile communication device, for example stored in an "electronic wallet" application executing on the mobile communication device. The credit card number may be associated with a credit card issued to a mobile communication service subscriber, for example a major credit card, a gas company credit card, or other credit card. The payment transaction using such a credit card may involve the near field communication transceiver transmitting confidential information associated with the credit card number stored in the memory of the mobile communication device. The credit card number may be unique and statically associated with a single subscriber and/or user associated with the mobile communication device.

SUMMARY

In an embodiment, a mobile communication device is disclosed. The mobile communication device comprises a near field communication (NFC) transceiver, a radio transceiver, a display, a processor, a memory, and an application stored in the memory. When executed by the processor, the application, in response to receiving a message from a point-of-sale (POS) terminal, presents a prompt to input identification information on the display, transmits a request for a processor routing number via the radio transceiver, and receives the processor routing number via the radio transceiver. The application further transmits the processor routing number and one of a phone number of the mobile communication device or an equipment identification of the mobile communication device to the point-of-sale terminal via the near field communication transceiver, whereby a payment transaction is completed with the point-of-sale terminal by the mobile communication device.

In an embodiment a method of processing a credit card payment transaction is disclosed. The method comprises receiving a credit card payment request from a point-of-sale (POS) terminal, wherein the credit card payment request is associated with a purchase transaction initiated by a mobile communication device with the point-of-sale terminal, wherein the mobile communication device is associated with a mobile communication service account with a mobile communication service provider, wherein the credit card payment request comprises identification information associated with the mobile communication service account and comprises a processor routing number. The method further comprises, based on the processor routing number, sending a request for service provider billing approval to the mobile communication service provider, wherein the request for service provider billing approval comprises the identification information associated with the mobile communication service account, receiving approval to bill the purchase transaction to the mobile communication service account associated with the mobile communication device from the mobile communication service provider, and, in response to receiving approval to bill the purchase transaction to the mobile communication service account, transmitting a credit card payment approval to the point-of-sale terminal.

In another embodiment, a method of billing a payment transaction to a mobile communication service account is disclosed. The method comprises receiving a request for mobile communication service provider billing approval from a payment processor, wherein the request comprises one of a phone number associated with a mobile communication service account or an equipment identification of a mobile communication device associated with the mobile communication service account. The request comprises a payment amount and a processor routing number, wherein the processor routing number is consistent in format with one of a block of numbers maintained by a mobile communication service provider, and wherein the processor routing number is used by different mobile communication devices associated with different mobile communication service accounts to complete payment transactions. The method further comprises identifying the mobile communication service account based on one of the phone number or the equipment identification of the mobile communication device, charging the payment amount against the mobile communication service account, and transmitting a service provider billing approval to the payment processor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
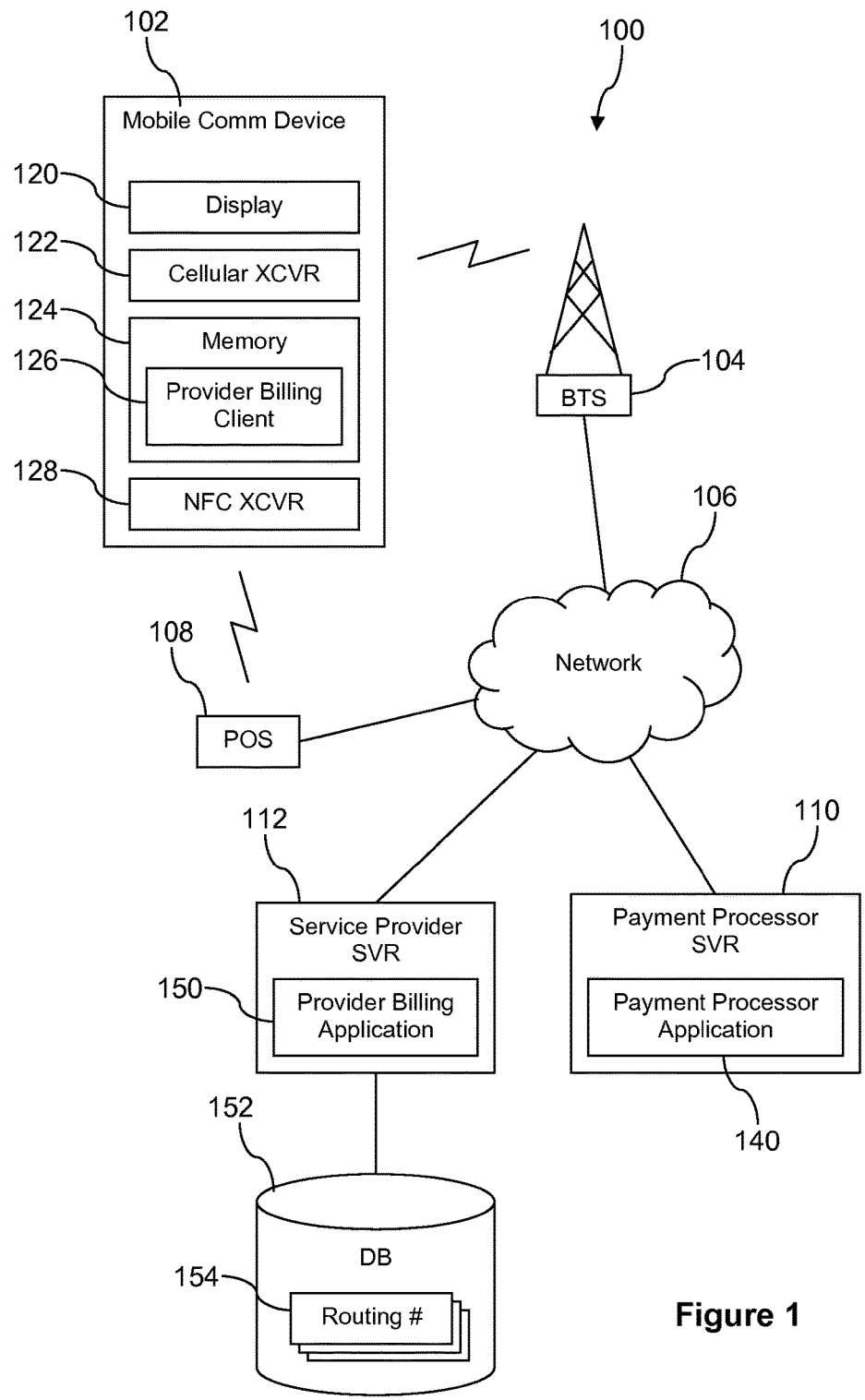
FIG. 1 is a block diagram of a communication system according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The disclosure teaches an electronic payment system for use by mobile communication devices in completing purchases, where payment for purchases is made by a mobile communication service provider and the cost is placed on a mobile communication service account bill associated with the device. In some contexts, this payment method may be referred to as mobile communication service provider billing, service provider billing, or carrier billing. A mobile communication device uses a near field communication (NFC) transceiver to initiate a payment transaction with a point-of-sale (POS) terminal, for example a POS terminal embedded in a parking meter. A service provider billing client application executing on the mobile communication device may prompt a user of the device to enter a code or security token, such as a personal identification number (PIN). This may be referred to as identification information in some contexts and may be used to authenticate that the authorized user is using the mobile communication device in a payment transaction and not someone who has stolen or found the device. The client application, after verifying that the input code matches a stored code, establishes a communication session with a mobile communication service provider system via a wireless cellular communication link with a base transceiver station (BTS) or via another wireless communication link, for example via a WiFi radio link or via a Bluetooth® radio link.

In an embodiment, the mobile communication service provider selects a processor routing number managed by the provider for use in a service provider billing program and returns this processor routing number to the mobile communication device via the wireless communication link. The service provider may manage a single processor routing number that is used by a plurality of mobile communication devices that participate in the service provider billing program to complete payment transactions with POS terminals. Alternately, the service provider may manage a plurality of processor routing numbers, for example about 10 processor routing numbers, about 100 processor routing numbers, about 1000 processor routing numbers, or some other number of processor routing numbers. In a preferred embodiment, the processor routing numbers comprise 16 decimal digits (e.g., a digit in the range '0' to '9') that are consistent with known standard credit card number formats, but the teachings of the present disclosure may be adapted for use with other credit card number formats either now in use or to be implemented in the future.

The mobile communication device then engages in a payment transaction via near field communication with the POS terminal, providing the processor routing number transmitted to it by the mobile communication service provider as well as other data about the device and/or mobile communication service subscriber. Said in other words, the mobile communication device provides the processor routing number and metadata to the POS terminal. The processor routing number lacks the customary association to a unique payer, which in this case is the mobile communication service subscriber associated with the mobile communication device. The association to the unique payer is provided by the metadata. The processor routing number provides the association to (e.g., provides the routing to) a payment processor and to a mobile communication service provider, and the metadata provides information that the service provider can use to identify the unique payer—one of the subscribers to the mobile communication service delivered by the mobile communication service provider. The metadata comprises information identifying the specific mobile communication device and/or identifying a subscriber. The metadata may further comprise the code entered by the user.

The POS terminal sends a standard credit card payment request to the payment processor that is identified by the processor routing number, where the request comprises the requested payment amount, the processor routing number, the metadata, and a merchant code that identifies the general business category of the POS terminal. The payment request sent by the POS terminal may comprise additional information, for example an identification of the POS terminal and/or information about the goods and/or services being purchased. The POS terminal determines to which of a plurality of payment processors to send the request (e.g., to which payment processor to route the request) based on the processor routing number. The payment processor may be identified or addressed by the POS terminal based on a leading digit of the processor routing number or based on some other sub-set of the digits of the complete processor routing number.

In an embodiment, the request may further comprise a unique identification of the POS terminal, for example an address of the POS terminal, a name of the POS terminal, a geographical coordinate of the POS terminal, or other identifier. In an embodiment, the request may further comprise an indication of the good or goods that are being purchased via the POS terminal.

The payment processor analyzes the processor routing number contained in the payment request and determines it is associated with (e.g., routes to or identifies) the mobile communication service provider for use in service provider billing transactions. Note that some payment requests received from the POS terminal by the payment processor can be expected to be conventional credit card payment requests and not payment requests related to service provider billing. The payment provider makes the distinction between conventional credit card payment requests and payment requests related to service provider billing based on the processor routing number or credit card number provided in the request (e.g., based on encoding or lack of encoding of the mobile communication service provider in the number). In an embodiment, one or more digits in the processor routing number may indicate that the number is to be processed as a processor routing number pursuant to service provider billing, thereby promoting easy and/or convenient discrimination from a number to be treated as a conventional credit card number. Alternatively, a digit may be constrained to a first range if the number is to be treated as a conventional credit card number and may be constrained to a second range if the number is to be treated as a processor routing number and processed pursuant to service provider billing. For example, a digit may be constrained to the range 0-4 for convention credit card numbers and constrained to the range 5-9 for processor routing numbers.

The payment processor may determine or identify the mobile communication service provider based on a leading digit of the processor routing number or based on some other sub-set of the digits of the complete processor routing number. In an embodiment, the digit signature that identifies the payment processor may be different from the digit signature that identifies the mobile communication service provider. For example, the leading digit of the processor routing number may identify and/or route to the payment processor, and the second digit of the processor routing number may identify and/or route to the mobile communication service provider. Alternatively, the leading digit of the processor routing number may identify the payment processor, and the second and third digits together may identify the mobile communication service provider. Alternatively, the first and second digits together may identify the payment processor, and the third digit may identify the mobile communication service provider. One skilled in the art will appreciate that other encodings of the identity of the payment processor and the mobile communication service provider are consistent with and contemplated by the teachings of the disclosure.

In an embodiment, there may be no distinct or independent encoding of the identity of the mobile communication service provider. This may be the case when only one mobile communication service provider among a plurality of service providers is known to support the service provider billing process described herein, for example when the process is first deployed in service. Additionally, this may be the case when a payment processor has integrated with only one mobile communication service provider. In an embodiment, there may be no distinct or independent encoding of the identity of the mobile communication service provider, and the payment processor may be configured to associate the one or more processor routing numbers maintained by the service provider to that mobile communication service provider, for example with a configured look-up table or other data structure.

The payment processor analyzes the metadata to determine the merchant code associated with the POS terminal. The payment processor rejects payment requests having merchant codes that are not approved by the mobile communication service provider. For example, the service provider may publish a white list to the payment processor, where the white list identifies the merchant codes approved by the service provider for participating in service provider billing transactions. The payment processor may encapsulate a reason message in a payment refusal message returned to the POS terminal, and the POS terminal may in turn encapsulate the reason message in a transaction termination message that it sends to the mobile communication device. The service provider billing client application executing on the mobile communication device may present a message on a display of the device that informs the user that the attempted payment transaction is not supported by the service provider billing system. The user may complete the transaction with the POS terminal using some other payment vehicle, for example using a physical credit card, a physical debit card, cash, check, or some other payment means.

If the merchant code contained in the credit card payment request is an approved code, the payment processor sends a request for service provider billing approval to the mobile communication service provider, where the request comprises the requested payment amount, the processor routing number, and the metadata. In an embodiment, the request may further comprise the merchant code. In an embodiment, the request may further comprise an identification of the POS terminal, for example an address of the POS terminal, a unique name of the POS terminal, a geographical coordinate of the POS terminal, or other identifier. In an embodiment, the request may further comprise an indication of the good or goods that are being purchased via the POS terminal. In an embodiment, the mobile communication service provider may accumulate data on POS terminal transactions and analyze the accumulated data to derive marketing information and/or marketing insights.

The service provider analyzes the request to determine a subscriber associated with the request. The service provider may analyze the code or personal identification number that is contained in the metadata and verify that the code matches a stored code associated with the subscriber. The service provider determines whether the subscriber account associated with the request is in good standing, for example if the subscriber is registered in the service provider billing program and if the subscriber's account balance is current (e.g., if payment on the account balance is not in arrears). The service provider may further check to see if a sum of service provider billing by the subscriber during a predefined billing period does not exceed a maximum per billing period.

In an embodiment, the approved merchant codes may be restricted to business categories associated with small purchase values, for example parking meters, vending machines (e.g., soft drink machines), taxi-cabs and the like. Restricting merchant codes to these business categories may be a risk reduction strategy—the opportunities for fraud and for consequent financial losses to the mobile communication service provider may be reduced. The limitation of the sum of service provider billing during a billing period by a subscriber may also be viewed as a risk reduction strategy. Approved merchant codes may be expanded to other business categories over time and as confidence builds in the security of this novel payment system.

If these checks succeed, the service provider debits the subscriber's billing account and sends payment approval to the payment processor. The payment processor sends credit card payment approval to the POS terminal. The POS terminal completes the sales transaction with the mobile communication device. In an embodiment, after completion of the payment transaction, the mobile communication device erases the processor routing number, for example from a memory of the device. Alternatively, in an embodiment, the processor routing number is stored in dynamically allocated memory by the provider billing application, and when the provider billing application finishes execution on completion of the payment transaction, the dynamically allocated memory storing the processor routing number is released and is virtually erased thereby (e.g., is not readable and/or recoverable by any conventional application that may execute on the mobile communication device).

In an embodiment, the payment processor may aggregate payment amounts over a period of time and settle with the service provider on periodic intervals, for example at the end of a business day, at the end of a month, at the end of a quarter, or at some other time interval. In an embodiment, the service provider may keep a deposit account controlled by the payment provider and maintain the account balance in a positive balance and/or with a minimum positive balance, and the payment processor may recover funds from that deposit account. Yet other financing arrangements between the service provider and the payment processor are contemplated by the present disclosure.

In an embodiment, the mobile communication service provider may maintain one or more actual credit card numbers that equate to the processor routing numbers. In a sense, the processor routing number is effectively a credit card number to some nodes in the payment transaction network, for example to the POS terminal. This aspect of the processor routing number allows it to be used by existing nodes in the payment system without change, for example to tunnel the payment transaction through the POS terminal and complete the payment transaction with service provider billing without the POS terminal having to be updated to perform according to a new paradigm or a new protocol. The compatibility of the processor routing number with existing credit card numbers and payment systems may have the benefit of making the deployment of a service provider billing model easier and may obviate the need to overcome resistance from existing retailers who have traditional POS terminals.

The processor routing number is different from a credit card number in how it is processed or treated at other nodes in the payment transaction network, for example at the payment processor and at the mobile communication service provider. The processor routing number does not serve the purpose of identifying the specific payer associated with a payment transaction, as is the case in a customary credit card payment transaction. In the case of the processor routing number, identification of the specific payer is supported by the metadata, for example the information identifying the mobile communication device and/or the subscriber.

Because the processor routing numbers are consistent with and have number values and/or formats consistent with standard credit card numbers, the mobile communication service provider may pay to own or maintain credit card numbers that correspond to the processor routing numbers. Maintaining a large number of credit card numbers has a cost. By using processor routing numbers that are shared among a plurality of participants in the service provider billing program, fewer credit card numbers are maintained and a considerable cost savings can be realized by the mobile communication service provider with reference to a system that depends on unique credit card numbers statically assigned to each participant. In an embodiment, the same processor routing number may be used by different subscribers at different times to complete payment transactions or used by different subscribers at substantially the same time to complete payment transactions. This reuse and/or overlapping use of the same number by different individuals is enabled by the separation between the routing function of the processor routing number and the identification of the ultimate payer—the subscriber associated with the billing account maintained by the mobile communication service provider. In an embodiment, the mobile communication service provider may use only a single processor routing number for the entire service provider billing program and hence only pay to maintain one standard credit card number.

In an embodiment, the mobile communication service provider may allocate processor routing numbers in a way to promote tracking purchasing behavior or recording purchasing behavior. For example, processor routing numbers may be allocated based on the location of subscribers. The processor routing numbers may be allocated based on time of purchase. The processor routing numbers may be allocated based on a subscriber payment date. The processor routing numbers may be allocated based on yet other bases. In an embodiment, multiple allocation schemes can be overlapped. Thus, participants residing in ten different regions may be allocated processor routing numbers with fifth and sixth digits that has numbers 0-9 to region 1, 10-19 to region two, . . . , 90-99 to region ten. Participants residing in region one may be allocated processor fifth and sixth digits of the routing numbers 0-4 during the week and processor routing numbers 5-9 on weekends. Other like encoding schemes for imbedding information about transactions in the processor routing number are contemplated by the present disclosure.

The service provider billing system described herein can promote efficient business practices, by reducing the cost of maintaining credit card numbers by sharing processor routing numbers among subscribers. Additionally, the service provider billing system restricts knowledge of the specific payer associated with a payment transaction to the mobile communication service provider, thereby providing new privacy protections relative to existing credit card payment systems where multiple nodes in the payment network are able to identify the specific payer (e.g., can know the credit card number that is uniquely associated to and hence is a proxy identity for the specific payer). This system also provides the opportunity to protect and restrict access to valuable mobile communication service subscriber profile and marketing information.

Turning now to FIG. 1, a communication system 100 is described. In an embodiment, the system 100 comprises a mobile communication device 102, a base transceiver station 104, a network 106, a point-of-sale (POS) terminal 108, a payment processor server 110, and a service provider server 112. The mobile communication device 102 may be a mobile phone, a smart phone, a media player, or a personal digital assistant. In an embodiment, alternatively, the mobile communication device 102 may be a laptop computer, a tablet computer, or a notebook computer. The network 106 may be any combination of private and/or public communication networks. The servers 110, 112 and the POS 108 may be implemented as computer systems. Computer systems are described further hereinafter.

In an embodiment, the mobile communication device 102 comprises a display 120, a cellular radio transceiver 122, a memory 124 that stores a service provider billing client 126, and a near field communication transceiver 128. The cellular radio transceiver 122 may be used to establish a wireless communication link with the base transceiver station 104, and the base transceiver station 104 may provide connectivity to the network 106 to the device 102. The wireless communication link may be established using one or more of a code division multiple access (CDMA) wireless communication protocol, a long term evolution (LTE) wireless communication protocol, a global system for mobile communication (GSM) wireless communication protocol, a worldwide interoperability for microwave access (WiMAX) wireless communication protocol, or another wireless communication protocol. In an embodiment, the base transceiver station 104 may be an enhanced node B (eNB), a cell tower, or other radio access network (RAN) radio node. In an embodiment, the mobile communication device 102 may further comprise a WiFi radio transceiver, a Bluetooth® radio transceiver, or other non-cellular radio transceiver.

The near field communication transceiver 128 may be used to establish a wireless communication link between the device 102 and the POS 108. The wireless communication link may be limited to a relatively short range, for example less than 10 feet, while the wireless communication link between the device 102 and the base transceiver station 104 may promote communication over a relatively long range, for example at least 100 feet or over several miles. The wireless link between the near field communication transceiver 128 and the POS 108 may be provided by radio communication links, by optical communication links (e.g., infrared), or by acoustic communication links. In an embodiment, the near field communication transceiver is a radio transceiver.

The POS 108 may be a point-of-sale terminal associated with a wide variety of businesses. In an embodiment, the user may use the device 102 to complete an electronic payment with a POS 108 embedded in a parking meter, for example to pay for an hour's worth of parking. In an embodiment, the user may use the device 102 to complete an electronic payment with a POS 108 embedded in a vending machine, for example to purchase a soft drink, to purchase stamps, or to rent a video. In an embodiment, the user may use the device 102 to complete an electronic payment with a POS 108 embedded in or mounted in a taxi-cab, for example to pay a taxi fare. In an embodiment, the user may use the device 102 to complete an electronic payment with a POS 108 located in a grocery store, for example to purchase a load of groceries. It is understood that the teachings of the present disclosure may be applicable to completing electronic payment transactions with a point-of-sale terminal embedded in or located in a wide range of businesses, organizations, or services.

When the near field communication transceiver 128 communicates with the POS 108, the provider billing client 126 may be activated or execute on a processor of the device 102. This may involve launching a process and/or thread associated with live execution of the provider billing client 126. After completion of the payment transaction with the POS 108, the process and/or thread associated with the live execution of the provider billing client 126 may be killed, deactivated, terminated, and/or unloaded and memory allocated for use by the provider billing client 126 when it was executing may be released and/or deallocated. In some contexts the provider billing client 126 may be referred to as a provider billing application. The provider billing client 126 may open a dialog box on the display 120 prompting a user of the device 102 to enter a code, for example to enter a personal identification number (PIN). The provider billing client 126 may compare the code entered by the user to a stored value of the code or PIN. If the entered code matches the stored value, the provider billing client 126 proceeds with provider billing processing. If the entered code does not match the stored value, the provider billing client 126 may terminate provider billing processing, for example after a predefined number of failed code input attempts.

Alternatively, the code may be transmitted to the service provider server 112, for example at the time a request for a processor routing number is transmitted from the device 102 to the server 112, and a provider billing application 150 executing on the server 112 may authenticate the user based on comparing the input code to a stored value of the code. It is contemplated that in an embodiment user authentication may be completed by the provider billing client 126 comparing a user input biometric, for example a fingerprint signature or a retina scan signature sensed by a biometric sensor integrated with the device 102, to a stored value of the biometric.

The provider billing client 126 may generate a processor routing number internally or may request a processor routing number from the service provider server 112. The routing numbers 154 may be stored by the service provider in a data store 152. The client 126 may be provisioned with a range of processor routing numbers maintained by the mobile communication service provider and associated to the service provider by the payment processor. The provider billing client 126 may select one of the processor routing numbers by an algorithmic process. Alternatively, the provider billing client 126 may hash a seed value to randomly generate a number in the range of processor routing numbers, for example hashing a current time or some other seed to a processor routing number in the provisioned number range.

As used herein, a processor routing number may have the format of an ordinary credit card number and may be processed as an ordinary credit card number by some elements of the payment system, for example by the POS 108. In an embodiment, the processor routing number is a 16-digit processor routing number. The processor routing number has an ordinary numerical structure and/or value range. Said in other words, the processor routing number looks like a standard credit card number. Unlike an ordinary credit card number, however, the processor routing number is not uniquely associated with and/or allocated to a single payer (e.g., a single mobile communication service account subscriber), and a processor routing number may be used by different users at different times or even, in an embodiment, at substantially the same time. It is well known that conventional credit card numbers are statically associated with a unique individual or payer. A credit card number associated to Mr. Smith today cannot legally be used by Mr. Jones to complete a payment transaction tomorrow and then legally used by Mr. Smith to complete a payment transaction on the day after tomorrow. Nor could Mr. Smith use the same credit card number to make a payment transaction now and Mr. Jones at the very same time complete a payment transaction using the same credit card number now.

Alternatively, the provider billing client 126 may request the provider billing application 150 to provide a processor routing number to it. In this case, the client 126 may send the code input by the user with the request for the processor routing number to the provider billing application 150. If the code sent with the request does not match a stored code value, the provider billing application 150 may reject the request for the processor routing number. The provider billing application 150 may return a processor routing number selected from a range of numbers maintained by the mobile communication service provider, for example a processor routing number may be selected from a bank identification number (BIN) range or from an issuer identification number (IIN) range maintained by the service provider. In an embodiment, the provider billing application 150 may maintain or manage only a single processor routing number selected from a single BIN or single IIN paid for and/or maintained by the mobile communication service provider. Alternatively, the processor routing number may be selected from a range of about 10, a range of about 100, a range of about 1000, or some other range of BINs or IINs paid for and/or maintained by the mobile communication service provider. The provider billing client 126 may request and the provider billing application 150 may return the processor routing number via a wireless link provided to the mobile communication device 102 by the base transceiver station 104 or an eNB, via a wireless link provided to the mobile communication device 102 provided by a WiFi access point, via a wireless link provided to the mobile communication device 102 provided by a Bluetooth® access point, or via another wireless link.

The provider billing client 126 sends the processor routing number along with other information that may be referred to as metadata or associated data to the POS 108. The metadata may comprise information that identifies the device 102, the user of the device, and/or the subscription account under which the device 102 receives mobile communication service from the mobile communication service provider. This identifying information may comprise a phone number, a mobile equipment identifier (MEID), an account number, or other. The metadata may further comprise the code input by the user. The metadata may comprise other information that relates to a context of the payment transaction such as a location of the device 102 such as geographical coordinates or an identity of the base transceiver station 104 with which the device 102 is currently attached.

The POS 108 identifies a payment processor based on the processor routing number. It is noted that from the perspective of the POS 108, the processor routing number appears to be an ordinary credit card number. The unusual character of the processor routing number does not attach to the structure or value of the number itself but rather attaches to how the payment processor and the mobile communication service provider use or process transactions involving the processor routing number. For example, the POS 108 may identify a payment processor based on the leading digit of the processor routing number and sends a credit card payment request to the payment processor server 110 associated with that identified payment processor. The credit card payment request comprises the payment amount, the processor routing number, the metadata, and a merchant code associated with the POS 108. In an embodiment, the credit card payment request may comprise other information about the context to the payment request, such as an identification of the POS 108 and/or information about the goods and/or services being purchased.

In an embodiment, a payment processor application 140 executes on the payment processor server 110. The payment processor application 140 receives the credit card payment request from the POS 108, analyzes the processor routing number, and determines that the processor routing number is to be processed as a service provider billing transaction. In service provider billing transactions, the payment processor may pay the POS 108 the amount of the transaction and recover or bill this amount from the mobile communication service provider and/or from a deposit account or line of credit maintained by the mobile communication service provider.

In an embodiment, when processing a service provider billing transaction, the payment processor application 140 filters the credit card payment requests from the POS 108 based on the merchant code sent in the requests, refusing credit card payment requests from those POS 108 having a merchant code that is not supported by the provider billing system of the subject mobile communication service provider. The payment processor application 140 may send an explanatory message back with the payment refusal, and the POS 108 may forward this message back to the device 102. In response to this forwarded message, the device 102 and/or provider billing client 126 may present a message on the display 120 stating that the requested transaction is not supported by the service provider billing system.

If the merchant code is supported, the payment processor application 140 sends a service provider billing approval request to the service provider server 112. The service provider billing approval request comprises the payment amount, the processor routing number, the metadata, optionally the code input by the user on the mobile communication device 102, and optionally the merchant code. In an embodiment, the service provider billing approval request may further comprise contextual information provided by the POS 108, for example an identity of the POS 108 and information about the goods and/or services being purchased. The service provider billing application 150 is invoked to process the request. The service provider billing application 150 may use the metadata to identify the mobile communication service account associated with the device 102, for example identifying the service account based on a phone number of the device 102 or based on a mobile equipment identifier. The service provider billing application 150 may authenticate the user of the device 102 by comparing a code provided in the metadata with a stored value of the code before processing further. If the authentication fails, the service provider billing application 150 may send a payment disapproval, a payment rejection, or payment refusal message back to the payment processor server 110 and/or the payment processor application 140. In response, the payment processor application 140 may send a payment refusal message back to the POS 108.

The provider billing application 150 may determine if the mobile communication service account associated with the payment request is in good standing, for example determine that the account balance is not in arrears or that a periodic payment associated with the account is not overdue. If the account balance is in good order, the provider billing application 150 may send a payment approval message to the payment processor server 110. The payment processor application 140 may send a payment approval message to the POS 108, thereby effectively paying the POS 108 according to customary credit card payment methods. At the same time the payment processor application 140 may transfer funds from a deposit account or draw on a standing line of credit maintained by the mobile communication service provider commensurate with the payment by the payment processor to the POS 108. The POS 108 completes the purchase transaction with the device 102.

In an embodiment, there may be a service provider billing per periodic interval limit that is imposed by the service provider. For example, a participant may be limited to charging a maximum of a predefined amount of money per billing cycle, for example limited to charging a maximum of $50 per month. It is understood that other predefined amounts of money may be used as limits and other periodic billing intervals are consistent with the present disclosure. In an embodiment, the predefined limits on participant periodic service provider billing may be different for different participants, for example different based on a payment history of the participants and/or based on a credit score of the participants. This limit on service provider billing per time interval may promote limiting fraud exposure for the mobile communication service provider and may make the system financially viable which otherwise might be prohibitively risky.

Figure 2:
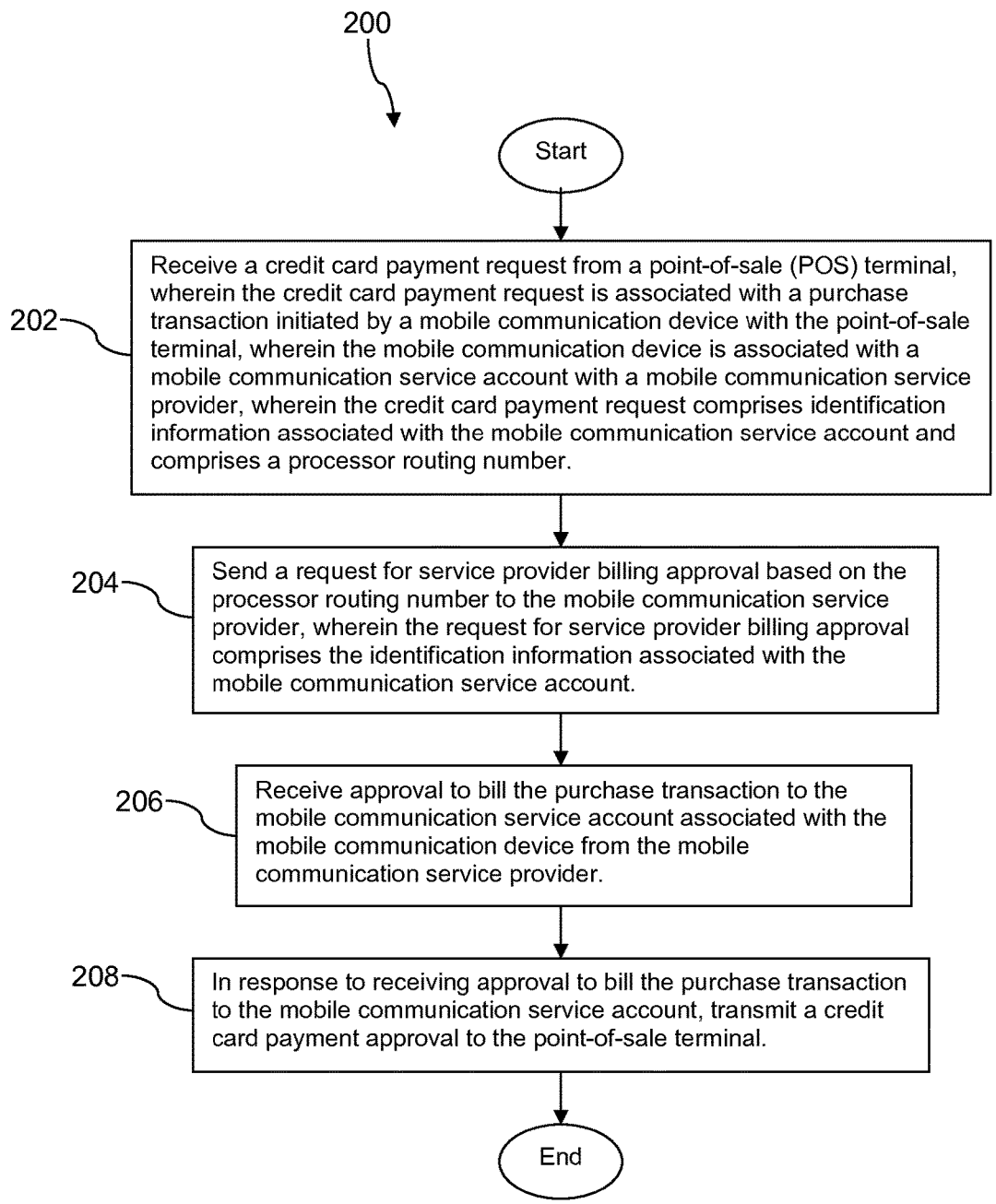
FIG. 2 is a flow chart of a method according to an embodiment of the disclosure.

Turning now to FIG. 2, a method 200 is described. At block 202, a credit card payment request is received from a point-of-sale (POS) terminal, for example by the payment processor server 110 and/or by the payment processor application 140. The credit card payment request is associated with a purchase transaction initiated by a mobile communication device with the point-of-sale terminal, wherein the mobile communication device is associated with a mobile communication service account with a mobile communication service provider. The credit card payment request comprises identification information associated with the mobile communication service account and comprises a processor routing number. For example, the identification information may comprise a phone number or a mobile equipment identify (MEID) of the mobile communication device that are associated with the mobile communication service account. The credit card payment request may further comprise a merchant code. In an embodiment, the payment processor server 110 and/or the payment processor application 140 filters payment requests based in part on the merchant code, as described further above.

At block 204, a request for service provider billing approval is sent based on the processor routing number to the mobile communication service provider. The request for service provider billing approval comprises the identification information associated with the mobile communication service account. The request may further comprise the payment amount. The request may further comprise a code or personal identification number.

At block 206, approval is received from the mobile communication service provider to bill the purchase transaction to the mobile communication service account associated with the mobile communication device 102. At block 208, in response to receiving approval to bill the purchase transaction to the mobile communication service account, transmit a credit card payment approval to the point-of-sale terminal.

Figure 3:
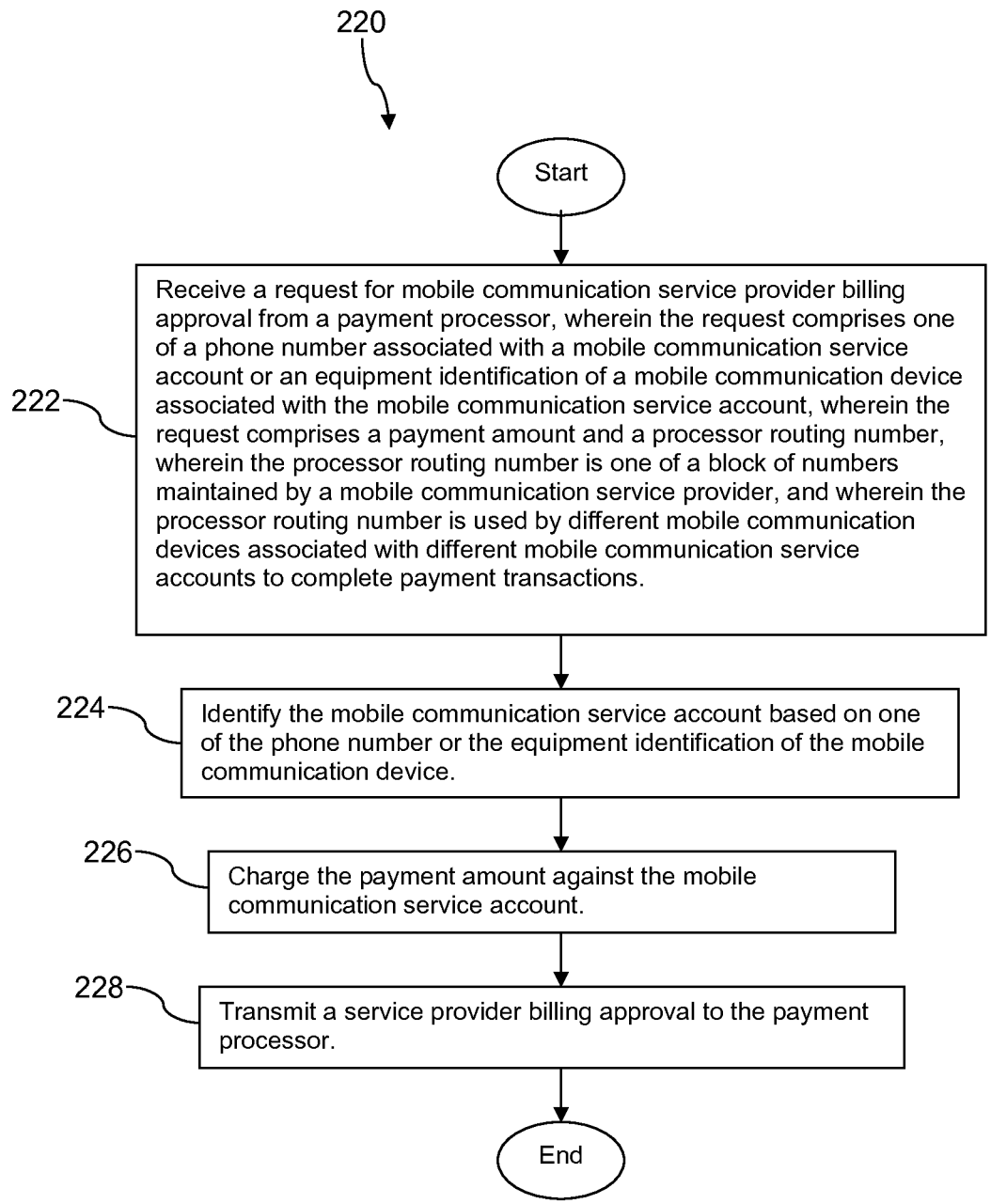
FIG. 3 is a flow chart of another method according to an embodiment of the disclosure.

Turning now to FIG. 3, a method 220 is described. At block 222, a request for mobile communication service provider billing approval is received from a payment processor. The request comprises one of a phone number associated with a mobile communication service account or an equipment identification of a mobile communication device associated with the mobile communication service account. The request comprises a payment amount and a processor routing number, wherein the processor routing number is consistent with the form of a credit card number from a block of credit card numbers maintained by a mobile communication service provider, and wherein the processor routing number is used by different mobile communication devices associated with different mobile communication service accounts to complete payment transactions. A processor routing number that is consistent with the form of a credit card number has the same number of digits as the credit card number, and each digit of the processor routing number has the same value as the corresponding digit of the credit card number. See above for further clarification and definition of the term 'processor routing number.'

At block 224, the mobile communication service account is identified based on one of the phone number or the equipment identification of the mobile communication device. At block 226, the payment amount is charged against the mobile communication service account. In an embodiment, between block 224 and block 226 other activities are performed. For example, the participation of a subscriber account in the service provider billing program or service may be confirmed. The account balance of the subscriber account may be analyzed to assure the account is not in arrears and is in good standing. The accumulation of charges to service provider billing during the current billing period may be determined and compared to a maximum predefined periodic limit applied to the subscriber account. The results of these other activities may cause the request for service provider billing to be rejected. At block 228, a service provider billing approval is transmitted to the payment processor.

In an embodiment, the method 220 further comprises receiving a request for a processor routing number from a second mobile communication device, wherein the second mobile communication device is different from the mobile communication device and not associated with the mobile communication service account associated with the mobile communication device 102. The method 220 further comprises transmitting the same processor routing number provided in the request for mobile communication service provider billing approval in block 224 to the second mobile communication device, whereby the mobile communication device and the second mobile communication device use the same processor routing number to complete payment transactions. The same processor routing number may be used to complete payment transactions by the different mobile communication devices at different times. Alternatively, in an embodiment, the same processor routing number may be allocated to the different mobile communication devices at substantially the same times and to complete payment transactions at substantially the same time.

In an embodiment, the method 220 further comprises receiving a second request for mobile communication service provider billing approval from the payment processor. The second request comprises one of a second phone number associated with a second mobile communication service account or a second equipment identification of the second mobile communication device associated with the second mobile communication service account. The request comprises a second payment amount and the same processor routing number used by the mobile communication device in block 222 above. The second mobile communication service account is identified based on one of the second phone number or the second equipment identification of the second mobile communication device. The second payment amount is charged against the second mobile communication service account. In some cases a second service provider billing approval is transmitted to the payment processor.

Figure 4:
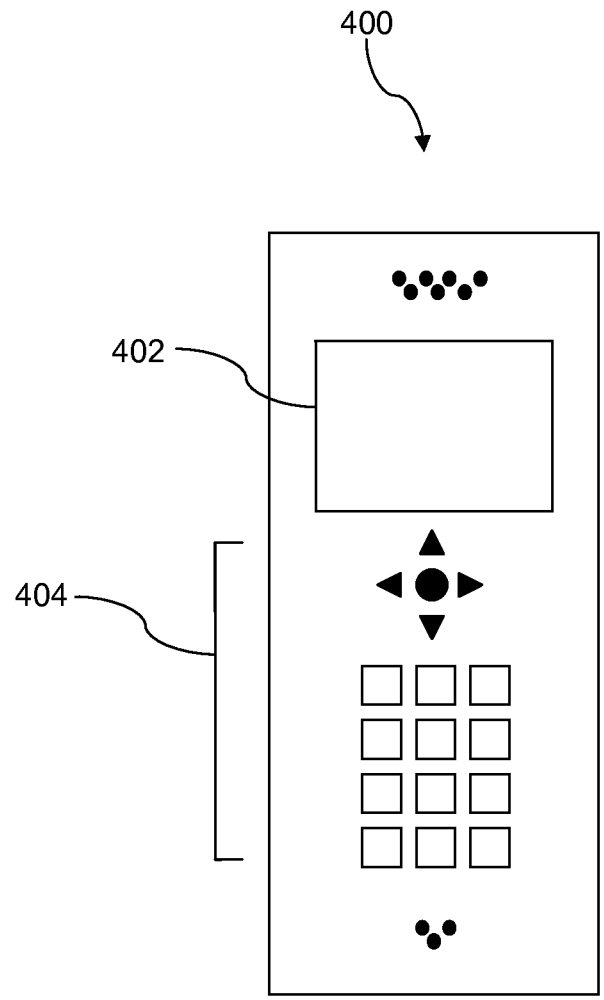
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
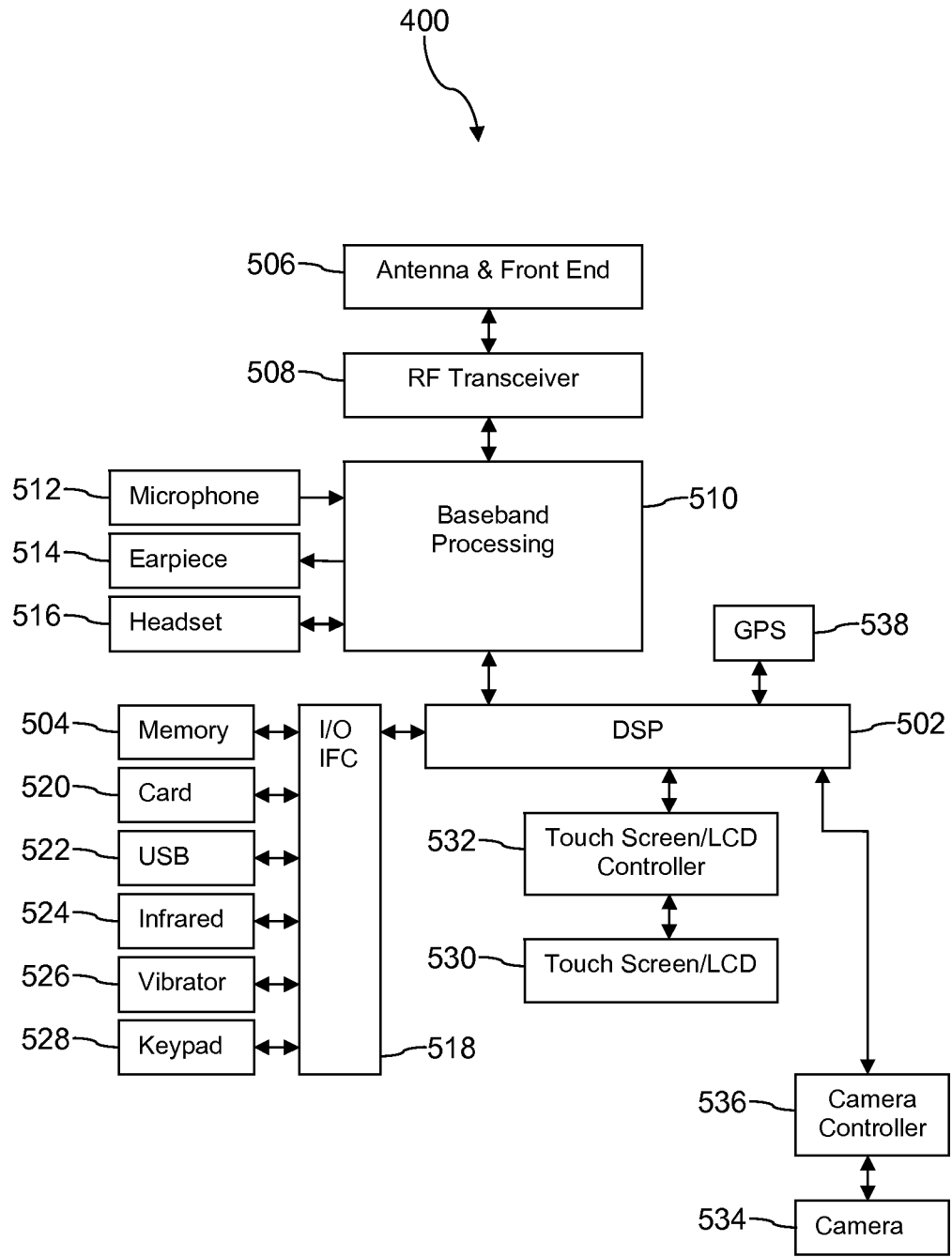
FIG. 5 is a block diagram of a hardware architecture of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
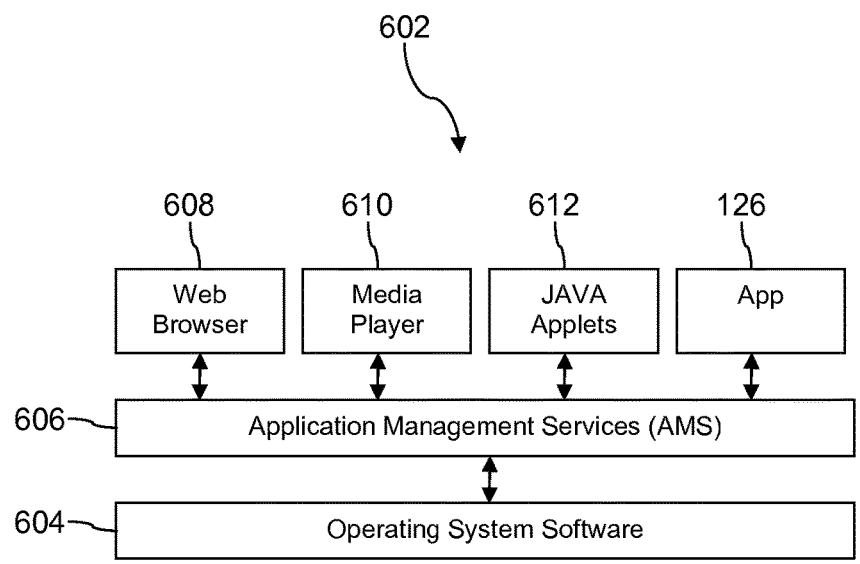
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. In an embodiment, the service provider billing client 126 may execute "on top of" or relying on service provided by the application management services 606 and/or by the operating system software 604.

Figure 6B:
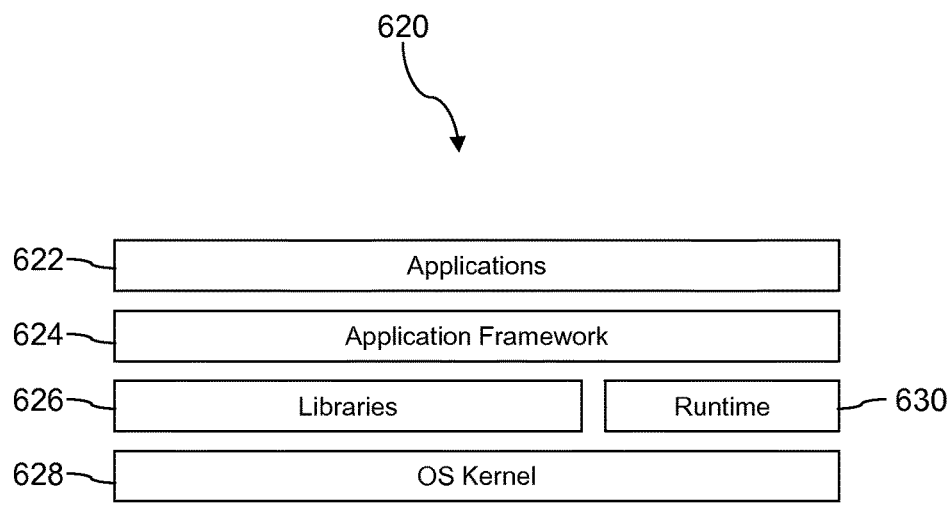
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
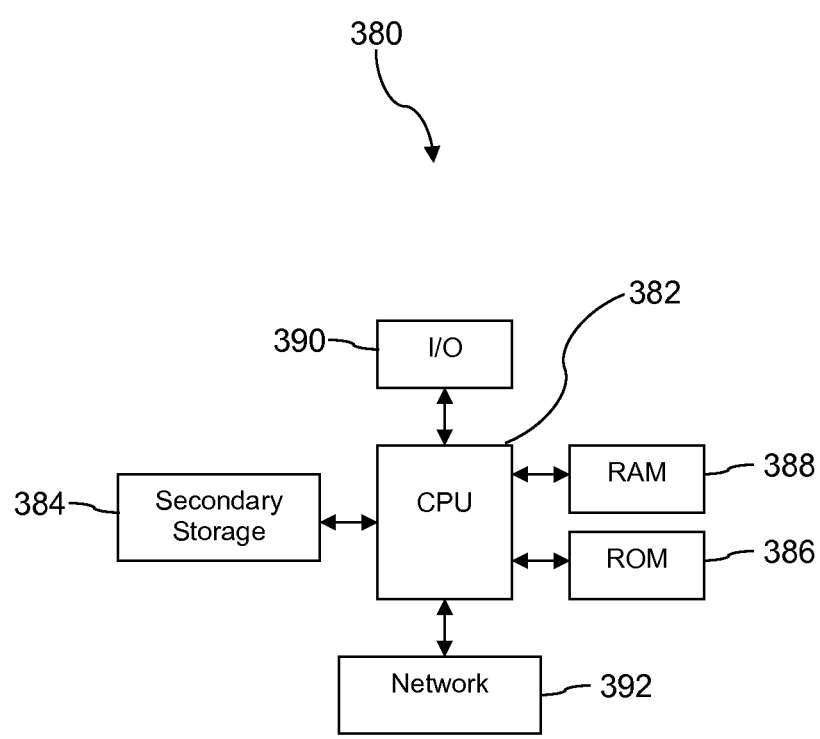
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for payment approval at a point-of-sale (POS) terminal comprising:
    a POS terminal for processing a transaction involving a payment;
    a mobile communication device in communication with the POS terminal and a service provider server, the mobile communication device comprising:
        a near field communication (NFC) transceiver;
        a radio transceiver;
        a display;
        a processor;
        a non-transitory memory; and
        an application stored in the non-transitory memory of the mobile communication device that, when executed by the processor of the mobile communication device:
            in response to receiving a message from the POS terminal, presents a prompt to input identification information on the display,
            receives the identification information,
            transmits, in response to receiving the identification information, a request for a processor routing number via the radio transceiver to the service provider server, wherein the processor routing number is a non-exclusive account number that is also used by other mobile communication devices that are not associated with a service account corresponding to the mobile communication device;
            receives, from the service provider server, the processor routing number via the radio transceiver, and
            transmits, to the POS terminal via the near field communication transceiver, the processor routing number and metadata that comprises at least one of a phone number of the mobile communication device or an equipment identification of the mobile communication device;
    a payment processor server in communication with the POS terminal and the service provider server, the payment processor server comprising:
        a processor;
        a non-transitory memory; and
        a payment processor application stored in the non-transitory memory of the payment processor server that, upon execution by the processor of the payment processor server:
            receives a payment process request from the POS terminal, wherein the payment process request comprises the processor routing number and the metadata,
            based on the processor routing number in the payment process request, determines that the processor routing number is not a standard credit card number and is to be processed as a service provider billing transaction with the service provider sever, and
            based on the determination, sends a payment authorization request to the service provider server corresponding to the processor routing number; and
    the service provider server in communication with the POS terminal and the payment processer server, the service provider server comprising:
        a processor;
        a non-transitory memory; and
        a billing application stored in the non-transitory memory of the service provider server that, when executed by the processor of the service provider server:
            receives, from the payment processor server, the payment authorization request, including the processor routing number and the metadata that was transmitted by the mobile communication device comprised in the payment process request,
            identifies the service account corresponding to the mobile communication device based on the received metadata,
            approves the payment authorization request based on the identified service account being in good standing, and
            based on the approval, sends a payment approval message to the payment processor server, wherein the payment processor server sends the payment approval message to the POS terminal and the POS terminal completes the transaction based on the payment approval message.

2. The device of claim 1, wherein the processor routing number is consistent in form with one of a block of credit card numbers maintained by a mobile communication service provider associated with the service provider server that provides mobile communication service to the mobile communication device.

3. The device of claim 2, wherein the processor routing number is associated with the payment processor server.

4. The device of claim 1, wherein execution of the application further validates an input comprising identification information against user identification information stored in the non-transitory memory of the mobile communication device.

5. The device of claim 1, wherein execution of the application further erases the processor routing number from the mobile communication device after the payment transaction is completed.

6. A method of processing a payment transaction, comprising:
  establishing, by a mobile communication device via a radio transmitter coupled to a network, a communication session with a service provider server, wherein the mobile communication device is associated with a service account on the network of a service provider;
  transmitting, from the mobile communication device executing a client application, a request for a processor routing number via the communication session to the service provider server;
  determining, by the service provider server executing an application stored in non-transitory memory, the processor routing number for use by at least the mobile communication device, wherein the processor routing number is a non-exclusive account number that is also used by other mobile communication devices that are not associated with the service account corresponding to the mobile communication device;
  providing, from the service provider server executing the application, the processor routing number to the mobile communication device via the radio transceiver;
  receiving, by the mobile communication device via the radio transmitter coupled to the network, the processor routing number from the service provider server;
  initiating, by executing the client application on the mobile communication device, a near field communication (NFC) transceiver on the mobile communication device for a purchase transaction;
  in response to initiation of the NFC transceiver, providing, from the mobile communication device to a point-of-sale (POS) terminal via the NFC transceiver, the processor routing number and metadata that comprises at least one of a phone number of the mobile communication device or an equipment identification of the mobile communication device;
  receiving, by a payment processor server executing a payment processor application stored in non-transitory memory, a payment process request from the POS terminal, wherein the payment process request comprises the processor routing number and the metadata;
  based on the processor routing number in the payment process request, determining, by the payment processor server executing the payment processor application, that the payment process request is not a standard credit card number and is to be processed as a service provider billing transaction by the server provider server, wherein the payment processer server identifies and routes to the service provider server based on the processor routing number;
  in response to the determination, sending, by the payment processor application of the payment processor server, a payment authorization request for service provider billing approval to the service provider server corresponding to the processor routing number, wherein the payment authorization request for service provider billing approval comprises the processor routing number and the metadata;
  receiving, by the service provider server from the payment processor application of the payment processor server, the processor routing number and the metadata comprised in the payment authorization request for service provider billing approval;
  identifying, by the service provider server, the service account corresponding to the mobile communication device based on the received metadata;
  authenticating, by the service provider server, that the mobile communication service account is in good standing based on the metadata, wherein the payment authorization request is approved based on the authentication;
  based on approval, sending, by the service provider server, a payment approval message to the payment processor server;
  receiving, by the payment processor application of the payment processor server, approval via the payment approval message to bill the purchase transaction to the service account associated with the mobile communication device from the service provider server; and
  in response to receiving approval to bill the purchase transaction to the service account via the payment approval message, transmitting, by the payment processor application of the payment processor server, the payment approval message to the POS terminal, wherein the POS terminal completes the purchase transaction based on the payment approval message.

7. The method of claim 6, further comprising transmitting the payment approval message to the POS based upon a merchant code, wherein the payment process request further comprises the merchant code.

8. The method of claim 7, further comprising sending, by the payment processor application, a message to the mobile communication device via the POS terminal that indicates that a disallowed payment transaction type was attempted.

9. The method of claim 6, wherein the payment process request further comprises a merchant code, and wherein sending the payment authorization request for service provider billing approval is further based on the merchant code being one of a taxi-cab merchant code, a vending machine merchant code, or a parking meter merchant code.

10. The method of claim 6, wherein the metadata associated with the mobile communication device comprises both the phone number and the equipment identification.

11. The method of claim 10, wherein the payment process request further comprises a personal identification number (PIN) associated with a user of the mobile communication device, and wherein the payment authorization request for service provider billing approval further comprises the PIN.

12. The method of claim 6, wherein the payment process request further comprises a payment amount, and wherein the payment authorization request for service provider billing further comprises the payment amount.

13. The method of claim 12, further comprising checking that a deposit account associated with the service provider contains a balance sufficient to cover the payment amount.

14. A method of billing a payment transaction to a mobile communication service account via a network, comprising:
  receiving, by a payment processor server executing a payment processor application on a processor from a non-transitory memory, a payment process request from a point-of-sale (POS) terminal for a purchase transaction initiated by the mobile communication device via an NFC transceiver, the payment process request comprising a processor routing number and metadata that comprises at least one of a phone number of the mobile communication device or an equipment identification of the mobile communication device, wherein the processor routing number is a non-exclusive account number that is also used by other mobile communication devices that are not associated with a service account corresponding to the mobile communication device;

based on the processor routing number, determining, by the payment processor server executing the payment processor application, that the payment process request is not a standard credit card number and is to be processed as a service provider billing transaction by a service provider server of a mobile communication service provider, wherein the payment processer server identifies and routes to the service provider server based on the processor routing number;

in response to the determination, sending, by the payment processor server executing the payment processor application, a payment authorization request for service provider billing approval to the service provider server corresponding to the processor routing number, wherein the payment authorization request for service provider billing approval comprises the processor routing number, the metadata, and a payment amount associated with the purchase transaction;

receiving, by the service provider server executing a billing application stored in a non-transitory memory, the payment authorization request for service provider billing approval from the payment processor server;

identifying, by the billing application of the service provider server, the service account based on one of the phone number or the equipment identification of the mobile communication device;

approving the payment authorization request based on determining, by the service provider server, that the identified service account is in good standing on a mobile communication service provider network;

based on the approval, charging, by the billing application of the service provider server, the payment amount against the service account; and transmitting, by the billing application of the service provider server, a payment approval message to the payment processor server, wherein the POS terminal completes the purchase transaction based on the payment approval message.

15. The method of claim 14, further comprising:
receiving, by the service provider server executing the billing application, a request for the processor routing number from the mobile communication device;
identifying, by the service provider server executing the billing application, the processor routing number in a pool of numbers maintained on the mobile communication service provider network by the service provider server for the mobile communication service provider;
transmitting, by the service provider server executing the billing application, the processor routing number to the mobile communication device via the mobile communication service provider network.

16. The method of claim 15, further comprising:
receiving, by the service provider server executing the billing application, a request for a processor routing number from a second mobile communication device, wherein the second mobile communication device is different from the mobile communication device and not associated with the service account; and
transmitting, by the service provider server executing the billing application, the processor routing number to the second mobile communication device, whereby the mobile communication device and the second mobile communication device use the same processor routing number to complete payment transactions.

17. The method of claim 14, wherein the payment process request further comprises a personal identification number (PIN), and further comprising validating, by the service provider server executing the billing application, the PIN based on comparison with a PIN associated with the mobile communication device stored in a data store maintained by the mobile communication service provider.

18. The method of claim 14, further comprising restricting, by the service provider server executing the billing application, a periodic payment charge accumulation to a predefined amount.

19. The mobile communication device of claim 1, wherein responsive to reception of the processor routing number, the non-transitory memory on the mobile communication device is dynamically allocated by the service provider server to store the processor routing number.

20. The mobile communication device of claim 1,
wherein the application further configures the processor of the mobile communication device to hash a seed that is within a predefined range of processor routing numbers for use in transmission to the POS terminal, the transmission of at least the processor routing number to the POS terminal being based on the seed, and
wherein the processor of the mobile communication device unloads a thread associated with execution of the application subsequent to completion of the payment transaction.

* * * * *